May 20, 1969     R. L. VAN HUIS     3,444,986
COMBINATION ANIMAL FEEDER HOPPER AND FEED
CONVEYOR CORNER STRUCTURE
Filed June 12, 1967

INVENTOR.
ROBERT L. VAN HUIS
BY *Price, Heneveld,
Huizenga & Cooper*

ATTORNEYS

United States Patent Office 3,444,986
Patented May 20, 1969

3,444,986
COMBINATION ANIMAL FEEDER HOPPER AND
FEED CONVEYOR CORNER STRUCTURE
Robert L. Van Huis, Zeeland, Mich., assignor, by mesne
assignments, to U.S. Industries, Inc., New York, N.Y.,
a corporation of Delaware
Filed June 12, 1967, Ser. No. 645,328
Int. Cl. B65g 47/18
U.S. Cl. 198—56    5 Claims

ABSTRACT OF THE DISCLOSURE

An animal feeder hopper having a pair of openings in its lateral walls near the bottom thereof, through which a feeder conveyor member may enter and leave the hopper, such openings being located in walls of the hopper oriented at an angle to each other, so that the conveyor member enters the hopper traveling in one direction and leaves the hopper traveling in another direction. Inside this hopper structure is a guide wheel located so that it receives the conveyor member on its outer periphery and mounted to rotate with the movement of the conveyor member, to thereby guide the same along a curving path between the angularly disposed entry and exit openings. A hold-down bracket is also mounted within the hopper and has a portion extending over the arcuate path along which the conveyor member travels within the hopper enclosure, to resist any upward movement of the conveyor member as it travels around the guide wheel. Preferably, the hopper is equipped with a means for facilitating the re-entry thereinto of feed which is returned by the conveyor member to the entry opening in the hopper, such means comprising a rotatably mounted cylindrical compacting element which is driven by the movement of the conveyor member.

Background of the invention

Feed hoppers have long been used in automated feeding systems for animals and poultry which feature a continuous conveyor member, typically a flat or other chain, wherein such chain enters the hopper at one side and leaves it at the opposite side, so as to travel straight through the hopper along a linear path in order to move feed out of the hopper and through a feeder trough in which the conveyor moves. Very frequently, the path taken by the continuous conveyor member and defined by the system of feeder troughs was essentially rectangular, and this required the presence of a means at each of the corners in the rectangular trough circuit for guiding the conveyor member around such corner, which typically was on the order of ninety degrees. Since chain-type conveyor members have predominated in usage in the past, the need for such a corner structure will be readily apparent, and where such a conveyor member was used, the most frequently encountered corner structure basically included a rotatably mounted sheave-type guide wheel, with the conveyor chain being entrained around a quarter of the wheel, and with the wheel rotating as the conveyor moved around it.

In recent times, the growing of poultry housed in confining cages is rapidly gaining in popularity, and in most such cage systems the cages are arranged in very closely adjacent rows, and even in tiers, i.e., rows of cages which are stacked atop other rows in order to minimize space requirements. In arrangements such as these, the space available for the feeding system has become drastically reduced and definitely a factor of critical importance. In many such cage arrangements, the space available for the feeder is not sufficient for the installation of a typical type of feeding system requiring a hopper, a continuous trough and conveyor member, and usually four corner structures for the conveyor member, one located at each of the corners of the rectangular trough arrangement. Still, automated feeding is essential in a crowded cage system where surprisingly great numbers of birds are kept in relatively small buildings. This situation has caused a very great number of problems and difficulties in the past, and few, if any, really constructive improvements have been offered until the present time to help remedy such problems.

Summary of the invention

The present invention provides a new concept in animal feeder hoppers of particularly great advantage when used in feeding systems of the type noted above, which helps to eliminate the forementioned space and operational problems associated with prior types of hopper structures when an attempt is made to use these in such an environment.

Briefly stated, the hopper structure of the present invention combines into a single structural unit, a hopper enclosure and an integral feed conveyor corner structure, so that the new form of hopper structure may be used at a corner of the feeder trough layout and will serve the purposes of both a hopper and a corner structure. Structurally, the combination hopper and corner structure of the invention comprises a hopper means including an enclosure defined by lateral and bottom walls, with a pair of spaced and relatively angularly-disposed openings in the lateral walls of the enclosure to form entry and exit openings in the hopper for the feed conveyor. Guide means are provided for locating and guiding the conveyor member along an angular path within the enclosure constituting a corner for the conveyor member as the latter moves from the aforesaid entry opening to the exit opening. Also, a hold-down structure is mounted within the hopper enclosure for restraining vertical movement of the conveyor member as the same turns the corner between the entry and exit openings and is guided therebetween by the said guide means.

Drawings

Preferred embodiment of the invention

Figure 1:
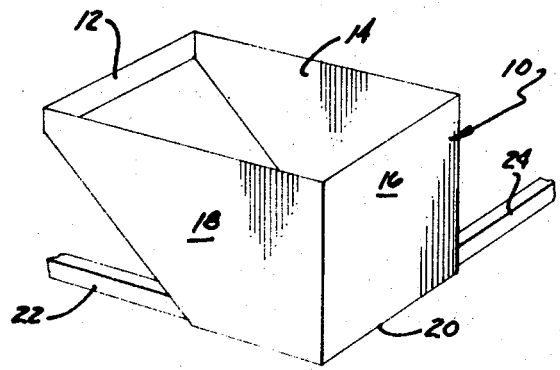
FIG. 1 is a fragmentary perspective view of the basic hopper structure of the invention, showing the feeder troughs entering and leaving the same.

In FIG. 1, the animal feeder hopper structure of the invention is seen at 10, and will be observed to include lateral walls 12, 14, 16, and 18, as well as a bottom wall 20, which together form an enclosure which may be open at the top if desired. Some of the lateral walls, such as for example walls 12 and 18, may be oriented at an angle to the vertical, so that the hopper 10 is downwardly convergent. Generally speaking, however, the four lateral walls are basically orthogonally related. A portion 22 of a typical feeder trough is illustrated communicating with the hopper 10 at an entry located near the bottom extremity of wall 12, and a similar portion of trough 24 is seen communicating with the hopper through an exit formed in wall 14. As will be observed, entry wall 12 and exit wall 14 are essentially perpendicular to each other, as are trough portions 22 and 24, and it consequently would be apparent that a continuous conveyor member moving within trough portion 22, through hopper 10, and within trough portion 24 must traverse a ninety-degree corner within the hopper 10.

Figure 2:
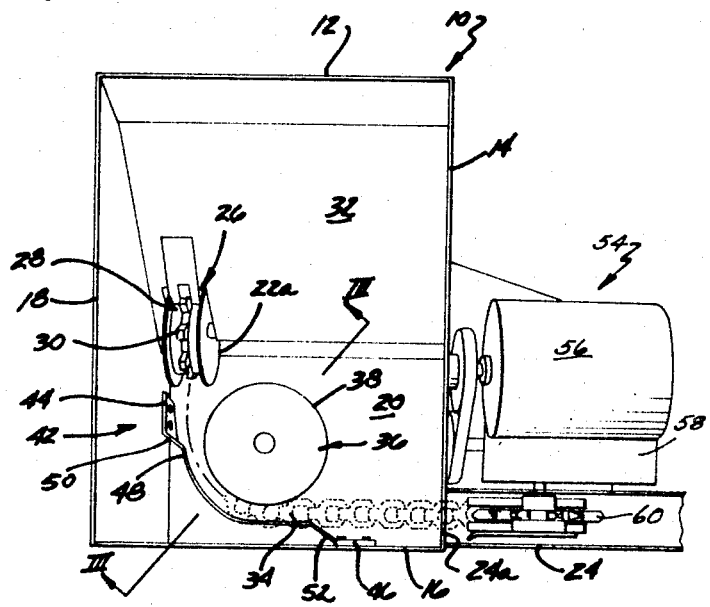
FIG. 2 is an enlarged plan view of the hopper structure of FIG. 1, showing its integral feed conveyor corner structure and showing in phantom a typical feed conveyor member.

The interior of the hopper structure 10 is seen in detail in FIG. 2, wherein it will be observed that a feed-saver means 26 is preferably incorporated therein in association with the aforesaid entry opening 22a, which communicates with the interior of the hopper through lateral wall 12. The feed-saver means 26 forms the subject matter of my previous U.S. Patent No. 3,272,400, issued September 13, 1966, to which reference is made for specific details. Basically, however, the feed-saver means comprises a rotatably mounted cylindrical compacting element 28 having a centrally-located circumferential sprocket-like gear 30 which engages the feed conveyor chain moving directly below it to rotate the compacting element 28. Also, an inclined secondary wall 32, mounted at an angle to lateral wall 12, is preferably included as a part of the feed-saver means 26, all of which is illustrated in the aforesaid previous patent.

As will be observed from FIG. 2, the conveyor member, shown as a generally flat conveyor chain 34, used in conjunction with the hopper structure of the invention enters the interior of the hopper 10 through entry opening 22a and passes along an angular path within the hopper around a guide means 36, so that the chain 34 leaves the hopper through exit opening 24a and within trough portion 24, along a line of motion which is perpendicular to that which it had upon entering the hopper.

Figure 3:
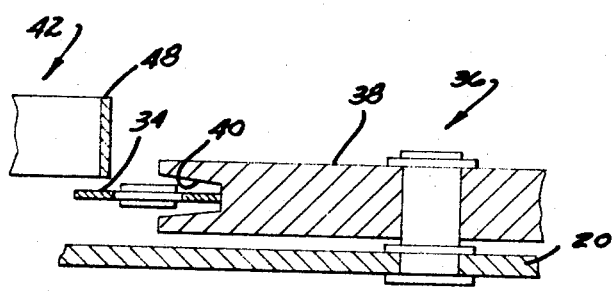
FIG. 3 is a further enlarged, fragmentary sectional elevation taken along the plane III—III of FIG. 2.

The guide means 36 comprises a sheave-like corner wheel 38, which is rotatably mounted to the bottom wall 20 of the hopper enclosure (FIGS. 2 and 3). Corner wheel 38 preferably has an annular groove 40 formed in its circular outer periphery for receiving the conveyor chain 34 sideways therein (FIG. 3), to thereby stabilize and guide the chain as it traverses its angular path within the hopper, such that said path has a smoothly arcuate excursion.

Also within the interior of the hopper enclosure 10 is a hold-down structure 42 (FIGS. 2 and 3). This structure is comprised in essence of a unitary bracket element, i.e., an element formed of a single piece of material, without secondary supporting or reinforcing portions or elements. The bracket element has a pair of generally flat end portions 44 and 46 oriented at ninety degrees to one other, by which the bracket element is secured to the orthogonal lateral walls 18 and 16, respectively. Also, the bracket element has an intermediate portion 48, which is angularly offset from the aforesaid end portions 44 and 46 by bracket portions 50 and 52 extending inwardly therefrom. The intermediate portion 48 is angularly excursive in its configuration, corresponding generally to the smoothly arcuate angular path of the conveyor chain 34 as the same traverses around the corner wheel 38. Intermediate portion 48 is spaced above the bottom wall 20, and is located so as to extend over the outer edge of the conveyor chain 34 as the latter traverses its aforesaid angular path (FIG. 3). The purpose of this bracket element is to restrain vertical movement of the conveyor chain as it traverses such path. That is, as the conveyor chain passes around the corner wheel 38 and makes its ninety-degree deviation, there is some tendency for the outer edge of the chain to cock upwardly, and the intermediate portion 48 of the hold-down structure 42 limits and restricts such upward movement in order to keep the chain generally flat at all times.

As FIG. 2 illustrates, a drive means 54 may, if desired, be included as a part of the present hopper structure. Such a means comprises a motor 56 connected by pulleys and a belt drive to a gearing train enclosed within a housing 58, with an output shaft from the latter driving a sprocket gear 60 which engages the conveyor chain 34 to drive the same. As illustrated, all of these components may conveniently be mounted on a flat plate 62 secured to or forming an extension of the bottom wall 20 of the hopper 10.

Having now fully described a preferred embodiment of the invention, its use and operation will be quite clear to those skilled in the art, as will its many advantages over the conventional devices which were known previously. The device of the invention achieves a new degree of equipment compactness and integration in the field of poultry and animal feeding in a manner believed never to have been provided before.

It is entirely conceivable that upon examining the foregoing disclosure, those skilled in the art may devise embodiments of the concept involved which differ somewhat from the preferred embodiment shown and described herein, or may make various changes in structural details to the present embodiment. Consequently, it is to be recognized that the preferred embodiment shown and described is for purposes of illustration only and is in no way intended to illustrate all possible forms of the invention.

I claim:

1. A combination animal feeder hopper and feed conveyor corner structure, comprising in combination: a hopper means including a downwardly convergent enclosure defined by a plurality of angularly intersecting, generally planar lateral walls and a generally flat bottom wall intersecting each of said lateral walls generally transversely; each of an intersecting pair of said lateral walls forming an opening located generally at the level of said bottom wall and disposed at an angle to the other such opening, one for admitting entry into and the other for providing an exit from said hopper means enclosure of a feed conveyor member; a single wheel-like guide member rotatably mounted within said enclosure parallel to and immediately above said bottom wall; said guide member locaated with respect to said pair of lateral walls so as to guide said conveyor member along an arcuate path extending between said angularly-disposed entry and exit openings and positioned at a distance from the intersection of said pair of walls; and a hold-down structure mounted within said enclosure for restraining vertical movement of said conveyor member as the same is guided around said arcuate path by said guide member; said structure comprising a bracket element having a first portion secured to at least one of said walls to mount such element and a second portion of thin horizontal cross-section offset angularly from said first portion and extending away from such wall, over at least a part of said arcuate path.

2. The structure of claim 1, wherein said hopper means further includes means located in proximity to said entry opening for facilitating the entry into said enclosure of feed returned to the hopper means by said conveyor member.

3. The combination of claim 1, wherein said hold-down bracket element comprises a rigid strip-like member having anchoring portions at its end extremities and a medial portion openly spaced from both said bottom and said lateral walls.

4. The combination of claim 1, wherein said entry and exit openings are each located in a different one of said intersecting pair of lateral walls at a point close to the intersection of its respective lateral wall and another of said plurality of lateral walls which defines no conveyor opening.

5. The combination of claim 4, wherein said entry and exit openings and said guide member are located with respect to each other and to said lateral walls such that said conveyor member in moving toward and away from said guide member moves along a path having a straight portion disposed generally parallel to said other lateral side and which is spaced from such side at least as near as the width of the conveyor member.

References Cited

UNITED STATES PATENTS

| | | | |
|---|---|---|---|
| 1,269,414 | 6/1918 | Fitterling | 198—137 |
| 2,738,765 | 3/1956 | Hart | 198—168 |
| 2,934,199 | 4/1960 | Winkler | 119—52 |
| 3,147,853 | 9/1964 | Van Huis | 119—52 |
| 3,155,226 | 11/1964 | Beiler | 198—182 |
| 3,176,655 | 4/1965 | Reimers | 198—168 |
| 3,240,312 | 3/1966 | Louendusky | 198—56 |

RICHARD E. AEGERTER, *Primary Examiner.*

U.S. Cl. X.R.

119—52